(No Model.)  3 Sheets—Sheet 1.

W. B. SIMPSON.
SEED PLANTER AND FERTILIZER DISTRIBUTER.

No. 353,979. Patented Dec. 7, 1886.

WITNESSES
W. W. Mortimer,
Wm. J. Little,

William B. Simpson,
INVENTOR
by J. R. Littell,
his Attorney.

(No Model.)

W. B. SIMPSON.
SEED PLANTER AND FERTILIZER DISTRIBUTER.

No. 353,979. Patented Dec. 7, 1886.

3 Sheets—Sheet 2.

(No Model.) 3 Sheets—Sheet 3.
W. B. SIMPSON.
SEED PLANTER AND FERTILIZER DISTRIBUTER.
No. 353,979. Patented Dec. 7, 1886.
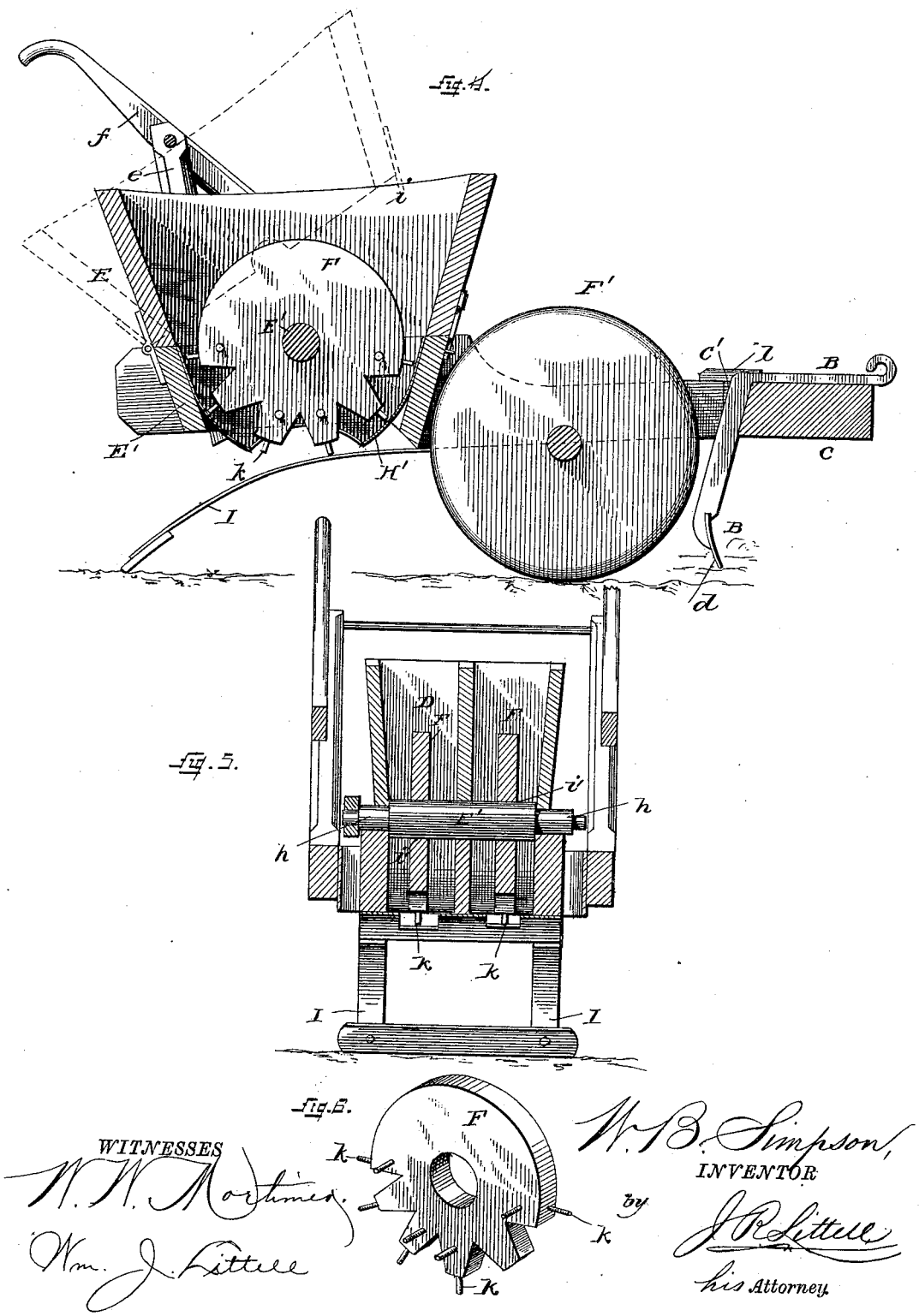
WITNESSES
W. W. Mortimer.
Wm. J. Little.
W. B. Simpson,
INVENTOR
by J. R. Little
his Attorney.
N. PETERS, Photo-Lithographer, Washington, D. C.

UNITED STATES PATENT OFFICE.

WILLIAM B. SIMPSON, OF RICHBURG, SOUTH CAROLINA.

SEED-PLANTER AND FERTILIZER-DISTRIBUTER.

SPECIFICATION forming part of Letters Patent No. 353,979, dated December 7, 1886.

Application filed March 26, 1886. Serial No. 196,698. (No model.)

*To all whom it may concern:*

Be it known that I, WILLIAM B. SIMPSON, a citizen of the United States, residing at Richburg, in the county of Chester and State of South Carolina, have invented certain new and useful Improvements in Seed-Planters and Fertilizer-Distributers; and I do hereby declare that the following is a full, clear, and exact description of the invention, which will enable others skilled in the art to which it appertains to make and use the same.

My invention relates to combined seed-planters and fertilizer-distributers, the object being to so mount the hopper and its supporting-wheel with relation to the carrying-frame and furrow-opener that should the plow or furrow-opener encounter an obstruction the carrying-wheel will not be raised from the ground, thereby allowing the hopper to continuously drop the seed and fertilizer, and obviating any liability to skip a space, as would be the case were the supporting-wheel which actuates the feed mechanism raised from the ground.

A further object of the invention is to provide an improved construction of feed-wheel and means for operating the same, whereby a perfect feed is secured and the seed from any cause whatever prevented from clogging in the hopper.

With the above and other objects in view the invention consists in the improved construction and combination of parts, hereinafter fully described, and pointed out in the claims.

Figure 1:
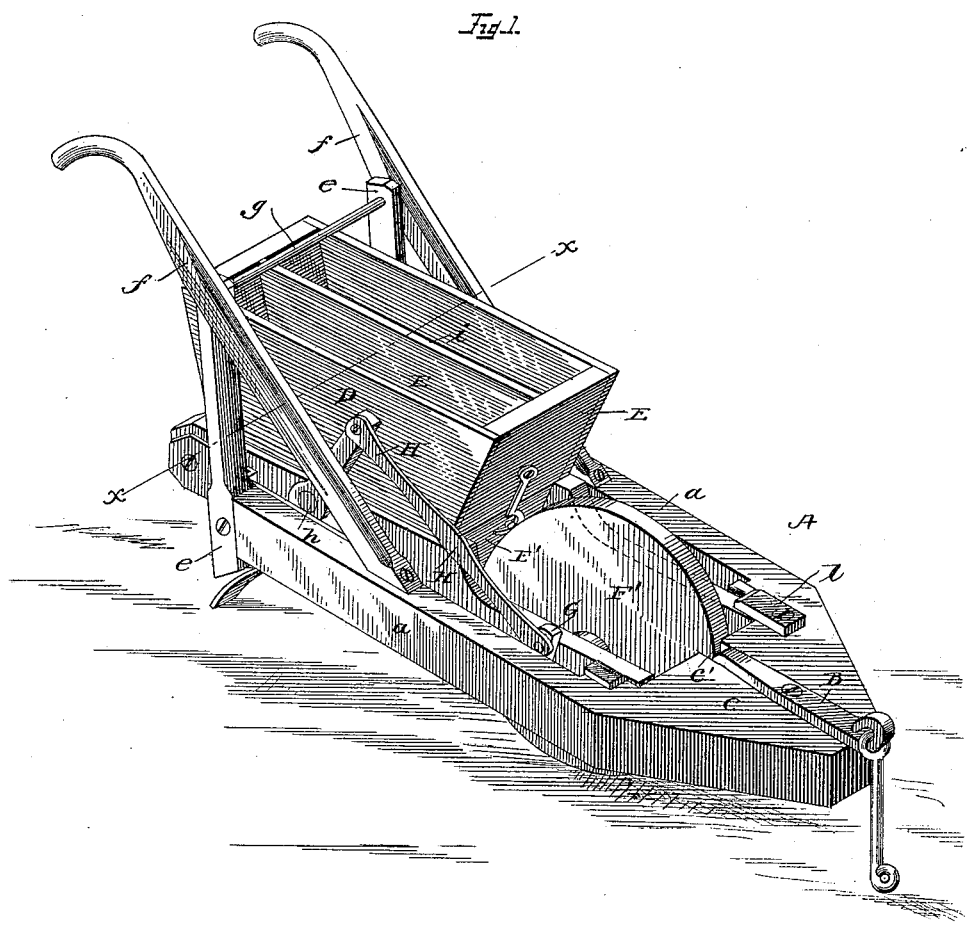
Figure 2:
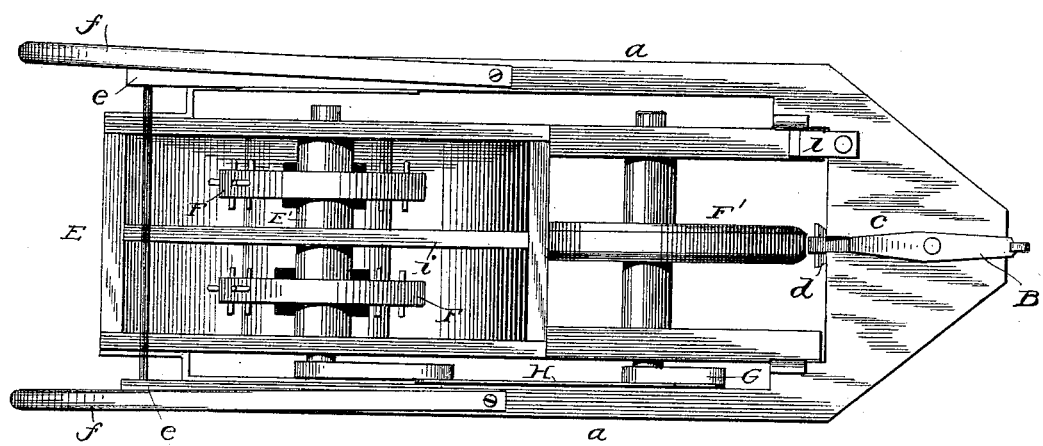
Figure 3:
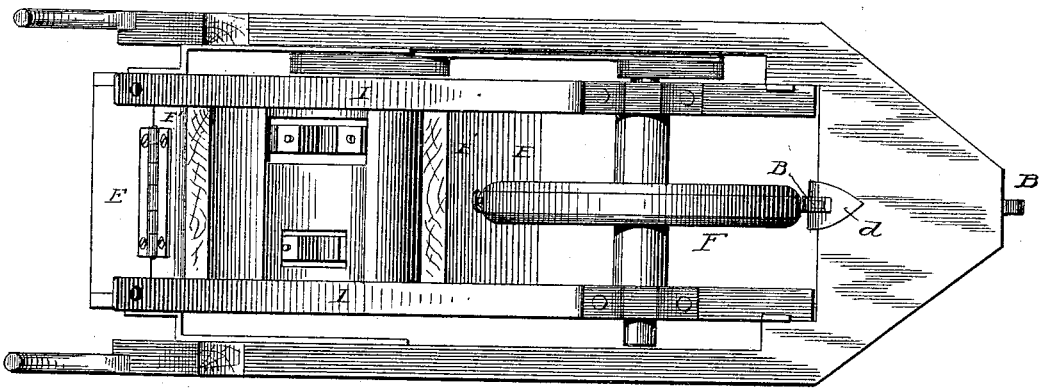

In the drawings, Figure 1 is a perspective view of a combined seed-planter and fertilizer-distributer embodying my invention. Fig. 2 is a plan view of the same. Fig. 3 is a bottom view. Fig. 4 is a longitudinal vertical section. Fig. 5 is a transverse vertical section on the line $x\,x$ of Fig. 1, and Fig. 6 is a detail view of the seed and fertilizer distributer feed-wheel.

Corresponding parts in the several figures are denoted by the same letters of reference.

Referring to the drawings, A represents a supporting-frame, which comprises the longitudinal side beams, $a$, connected at or near their rear ends by a cross or tie beam, C, and at their forward ends by a platform strip, $c$, having a recess, $c'$, on its rear face.

B represents the furrow-opener, which consists of a single piece of metal, bent at its forward end to form an eye for receiving the draft attachment and extending from the top of the platform downwardly, and having secured at its lower end a plow or shovel, $d$, said furrow-opener having its main or body portion resting in the recess $c'$, which holds it against lateral movement.

Extending upwardly from the rear ends of the side beams are standards $e$, and extending from the side beams, to which they are secured, are handles $f$, secured near their upper ends to the standards by a transverse rod, $g$.

Near the rear end of the supporting-frame A are located short rods or shafts, $h$, which have bearing in the sides of the hopper D, so that said hopper may move vertically at its forward end. The hopper D is composed of two sections, E E', hinged together and adapted to be locked by a hook pivoted to one section and adapted to engage a pin or loop on the other section. The hopper is divided into two compartments by a vertical partition, $i$, one of which is for seed and the other for fertilizer. The partition-wall, like the hopper, is of two sections, and the meeting ends of the sections and the partition are formed with semicircular recesses $i'$, to receive a shaft, E'. Upon the shaft E' are seed-wheels F, one for each compartment, said seed-wheels having teeth on the under or lower half of their peripheries, and having laterally-projecting pins $k$ on the lower portions.

The side beams of the hopper extend forwardly to the platform-strip, and have secured to their forward ends angular plates, which are adapted to rest on the side beams and support the hopper. When desired, the hopper may be held against vertical movement by turning a pivoted button, $l$, into engagement with one of the side beams of the hopper.

Mounted between the side beams of the hopper is a carrying-wheel, F', the shaft of which at one end extends beyond one of the said beams, and has mounted thereon a crank-arm, G, which is connected with a similar crank-arm on the shaft of the feeding-disks by a pitman, H. It will thus be seen that as the carrying-wheel revolves it will rotate the crank-arm on the shaft thereof, and cause the feeding-disks to be oscillated through the medium of the pitman and crank-arm on the feeding-disk shaft. The bottom H' of the hopper is, as shown, convex, and is provided with feed-openings, one for each compartment of the hopper.

By providing the oscillating feed-disks the seed and fertilizer is constantly stirred or agitated, and is effectively fed or dropped through the feed-openings of the hopper.

Should the plow or furrow-opener encounter an obstruction, the rotation of the carrying-wheel will not be prevented, since it will not be lifted from the ground; hence the seed is evenly fed at all points.

I represents coverers, each of which consists of a curved plate or strip of metal secured to the under faces of the side beams of the supporting-frame, and resting at their rear free ends upon the ground.

A combined seed-planter and fertilizer-distributer, constructed as before described, is simple in its construction, strong and durable, and thoroughly effective in its operation.

Having thus fully described my invention, what I claim as new, and desire to secure by Letters Patent, is—

1. The combination, with a supporting-frame, of a hopper pivoted to the latter at its rear end and comprising a stationary and a hinged section, means for securing the sections together, means for holding the hopper stationary, a feeding-wheel in the hopper, and means for actuating it, substantially as set forth.

2. The combination, with a supporting-frame, of a hopper pivotally connected therewith at its rear end and having its side beams extending forwardly, a button pivoted to the frame and adapted to engage one of said beams, a feeding-wheel having teeth on the lower portion of its periphery, pins projecting downwardly and laterally from said teeth, and means for operating said feeding-wheel, substantially as set forth.

3. The combination, with a supporting-frame, of a hopper pivotally connected therewith at its rear end, the side beams of the hopper extending forwardly, angular plate secured to said side beams, and a button or catch, as set forth.

In testimony whereof I affix my signature in presence of two witnesses.

WILLIAM B. SIMPSON.

Witnesses:
PAUL HEMPHILL,
JNO. T. ELLIOTT.